United States Patent
Lee et al.

(10) Patent No.: US 7,669,287 B2
(45) Date of Patent: Mar. 2, 2010

(54) HINGE STRUCTURE THAT ALLOWS ADJUSTMENT OF INCLINED ANGLE OF THE LOAD SUPPORTED THEREON

(75) Inventors: Haung Wen Lee, Sinjhuang (TW); Tasi Shuen Liang, Sinjhuang (TW)

(73) Assignee: Jarllytec Co., Ltd., Taipei County (TW)

( * ) Notice: Subject to any disclaimer, the term of this patent is extended or adjusted under 35 U.S.C. 154(b) by 561 days.

(21) Appl. No.: 11/714,500

(22) Filed: Mar. 6, 2007

(65) Prior Publication Data
US 2008/0052875 A1   Mar. 6, 2008

(30) Foreign Application Priority Data
Sep. 6, 2006   (TW) .............................. 95215817 U

(51) Int. Cl.
*E05D 11/08* (2006.01)
*E05D 3/06* (2006.01)
(52) U.S. Cl. .............................. 16/340; 16/366; 16/327; 16/371; 361/679.06
(58) Field of Classification Search .................. 16/340, 16/339, 347, 366, 327, 326, 343, 345, 371; 361/679.06, 679.16, 679.27; 248/917–924, 248/291.1, 284.1, 276.1; 455/575.1, 575.3, 455/575.4, 575.8, 550.1, 90.3; 348/373, 348/333.06, 794
See application file for complete search history.

(56) References Cited

U.S. PATENT DOCUMENTS

| | | | |
|---|---|---|---|
| 6,018,847 A * | 2/2000 | Lu ............................... | 16/337 |
| 6,666,422 B1 * | 12/2003 | Lu et al. ................... | 248/291.1 |
| 6,822,857 B2 * | 11/2004 | Jung et al. ............. | 361/679.02 |
| 7,299,525 B2 * | 11/2007 | Chang ........................ | 16/327 |
| 7,380,313 B2 * | 6/2008 | Akiyama et al. .............. | 16/367 |
| 7,444,716 B2 * | 11/2008 | Hsu ............................ | 16/366 |
| 2003/0001057 A1 * | 1/2003 | Sweere et al. ............. | 248/276.1 |
| 2003/0223188 A1 * | 12/2003 | Ha et al. ..................... | 361/681 |
| 2004/0211866 A1 * | 10/2004 | Jung et al. .................. | 248/133 |
| 2006/0032998 A1 * | 2/2006 | Depay ..................... | 248/291.1 |
| 2006/0101619 A1 * | 5/2006 | Tai .............................. | 16/366 |
| 2007/0195495 A1 * | 8/2007 | Kim et al. .................. | 361/681 |
| 2007/0210221 A1 * | 9/2007 | Kim et al. ................ | 248/124.1 |

* cited by examiner

*Primary Examiner*—Chuck Y. Mah
(74) *Attorney, Agent, or Firm*—Guice Patents PLLC

(57) ABSTRACT

A hinge structure is disclosed to include a first hinge structure and a second hinge structure respectively mounted on the base member and cover of a lifter cover type mobile electronic product, two master connecting members coupled between the first hinge structure and the second hinge structure for allowing the cover to be opened from the base member, and two auxiliary connecting members coupled between the first hinge structure and the second hinge structure in such a manner that the auxiliary connecting members lock the cover to the second hinge structure and the cover is closed on the base member, and unlock the cover from the second hinge structure for adjustment of the inclined angle of the cover when the cover is opened from base member.

10 Claims, 8 Drawing Sheets

A-A

B-B

HINGE STRUCTURE THAT ALLOWS ADJUSTMENT OF INCLINED ANGLE OF THE LOAD SUPPORTED THEREON

BACKGROUND OF THE INVENTION

1. Field of the Invention

The present invention relates generally to hinge structures and more particularly, to a hinge structure for use in a lifting cover type mobile electronic product that allows adjustment of the inclined angle of the cover when the cover is opened to a range within a predetermined angle.

2. Description of the Related Art

A lifting cover type consumer electronic product, such as mobile computer, electronic dictionary, mobile CD/VCD/DVD player, lifting cover type cell phone, etc., generally uses a hinge structure to joint the cover to the base member so that the cover can be opened and closed relative to the base member. Therefore, the hinge structure is an important factor that determines the quality of the product. Except positive positioning, the limitation of the opening angle must be taken into account when designing a good hinge structure.

The hinge structure of a regular mobile computer simply allows the cover of the mobile computer to be opened and closed. It does not allow the user to adjust the inclined angle of the cover relative to the user when the cover is opened to a particular angle. Therefore, a conventional mobile computer user is restricted to the visible angle and distance of the display screen (cover), i.e., the hinge structure of a conventional mobile computer is not in conformity with human-factors engineering.

Actually, if the cover of a mobile computer has an inclination adjusting mechanism, the visible distance between the user and the display screen can then be shortened, and the display screen can be adjusted to the best view angle, enhancing the convenience of use. However, conventional hinge structures for mobile computer do not provide this function.

Therefore, it is desirable to provide a hinge structure that eliminates the aforesaid problem.

SUMMARY OF THE INVENTION

The present invention has been accomplished under the circumstances in view. According to one aspect of the present invention, the hinge structure is installed in a cover lifting type mobile electronic product to couple a cover to a base member for allowing the cover to be opened from the base member and then closed on the base member. The hinge structure comprises master connecting means, the master connecting means having a bottom end at a bottom side thereof and a top end at a top side thereof; auxiliary connecting means arranged in parallel to the master connecting means, the auxiliary connecting means having guide means at a bottom side thereof and retaining means at a top side thereof, the auxiliary connecting means being movable forwards and backwards relative to the master connecting means; a first hinge unit mounted on the base member of the lifting cover type mobile electronic product and pivoted to the bottom end of the master connecting means for allowing biasing of the master connecting means relative to the base member of the lifting cover type mobile electronic product, the first hinge unit comprising at least one guide pin inserted through the guide means of the auxiliary connecting means; and a second hinge unit mounted on the cover of the lifting cover type mobile electronic product and pivoted to the top end of the master connecting means and set in the retaining means of the auxiliary connecting means to prohibit biasing of the cover relative to the master connecting means. When opening the cover from the base member, the master connecting means is turned with the cover relative to the base member and the guide means of the auxiliary connecting means is moved relative to the guide pin to have the second hinge unit be moved outwards from the retaining means of the auxiliary connecting means for allowing the cover be further biased relative to the master connecting means.

According to another aspect of the present invention, the guide means comprises at least one vertical sliding slot; the retaining means comprises at least one Y-shaped notch. Further, the master connecting means comprises a plurality of mounting holes and a plurality of fastening members respectively affixed to the mounting holes of the master connecting means. The auxiliary connecting means comprises a plurality of elongated slots respectively coupled to the fastening members at the mounting holes of the master connecting means to secure the auxiliary connecting means to the master connecting means and to guide forward and backward displacement of the auxiliary connecting means relative to the master connecting means.

According to still another aspect of the present invention, the master connecting means is shaped like a channel bar having two master connecting members arranged in parallel and a flat base joining the two master connecting members.

According to still another aspect of the present invention, the first hinge unit is comprised of two first hinges. Each first hinge comprises a first mounting frame affixed to the base member of the lifting cover type mobile electronic product, the first mounting frame having an upright lug and a pivot hole on the upright lug, a second mounting frame affixed to the first mounting frame, the second mounting frame having an upright lug and a pivot hole on the upright lug, a pivot shaft, which has a first end fixedly connected to the bottom end of the master connecting means and a second end inserted through the pivot hole on the upright lug of the first mounting frame and the pivot hole on the upright lug of the second mounting frame, an end cap fastened to the second end of the pivot shaft, and at least one spring member mounted on the second end of the pivot shaft and stopped between the upright lug of the second mounting frame and the end cap.

According to still another aspect of the present invention, the second mounting frame of each first hinge is fixedly fastened to the bottom wall of the associating first mounting frame with fastening members.

According to still another aspect of the present invention, the first mounting frame and second mounting frame of each first hinge each have a front stop edge and a rear stop edge; the first hinges each further comprise a return spring assembly mounted on the second end of the pivot shaft and stopped against the front stop edge and rear stop edge of the first mounting frame and second mounting frame of the associating first hinge. The return spring assembly comprises two rotating plates respectively affixed to the second end of the pivot shaft of the associating first hinge and respectively abutted against the upright lugs of the first mounting frame and second mounting frame of the associating first hinge for synchronous rotation with the associating pivot shaft relative to the first mounting frame and second mounting frame of the associating first hinge, the rotating plates each having a front stop edge and a rear stop edge; a sleeve sleeved onto the second end of the pivot shaft of the associating first hinge between the two rotating plates; and a torsional spring arranged around the sleeve, the torsional spring having a first end stopped at the front stop edge of the upright lug of the first mounting frame of the associating first hinge, and a second end stopped at the rear stop edge of the upright lug of the second mounting frame of the associating first hinge. When the pivot shaft of each first hinge is rotated with the master connecting means in one direction, the rotating plates of the associating return spring assembly are rotated with the associating pivot shaft, thereby causing the associating torsional spring to be twisted and compressed; when the pivot shaft of each first hinge is rotated with the master connecting means in the reversed direction, the rotating plates of the associating return spring assembly are rotated with the associating pivot shaft, thereby causing the associating torsional spring to be released.

According to still another aspect of the present invention, the first hinges each further comprise a plurality of friction pads mounted on the associating pivot shaft for synchronous rotation with the associating pivot shaft and respectively set between the associating first mounting frame and second mounting frame and the associating rotating plates.

According to still another aspect of the present invention, first hinges each further comprise a limiter means installed in the associating first and second mounting frames to limit the rotating angle of the associating pivot shaft, the limiter means comprising a first stop fixedly provided at the upright lug of the associating first mounting frame, a second stop fixedly provided at the upright lug of the associating second mounting frame, and two limiter plates affixed to the second end of the associating pivot shaft and respectively disposed at one side of the upright lug of the associating first mounting frame and the upright lug of the associating second mounting frame, the limiter plates each having a protrusion corresponding to the first stop at the upright lug of the associating first mounting frame and the second stop fixedly provided at the upright lug of the associating second mounting frame.

According to still another aspect of the present invention, the second hinge unit is comprised of two second hinges, the second hinges each comprising a pivot shaft, a plurality of friction pads, a plurality of spring members, and an end cap, the pivot shaft of each of the second hinges having a first end affixed to the cover of the lifting cover type mobile electronic product and attached to the retaining means of the auxiliary connecting member and a second end pivotally inserted through a hole of the master connecting member and the friction pads and the spring members of the respective second hinge and then fastened up with the end cap of the respective second hinge.

DETAILED DESCRIPTION OF THE INVENTION

Figure 1:
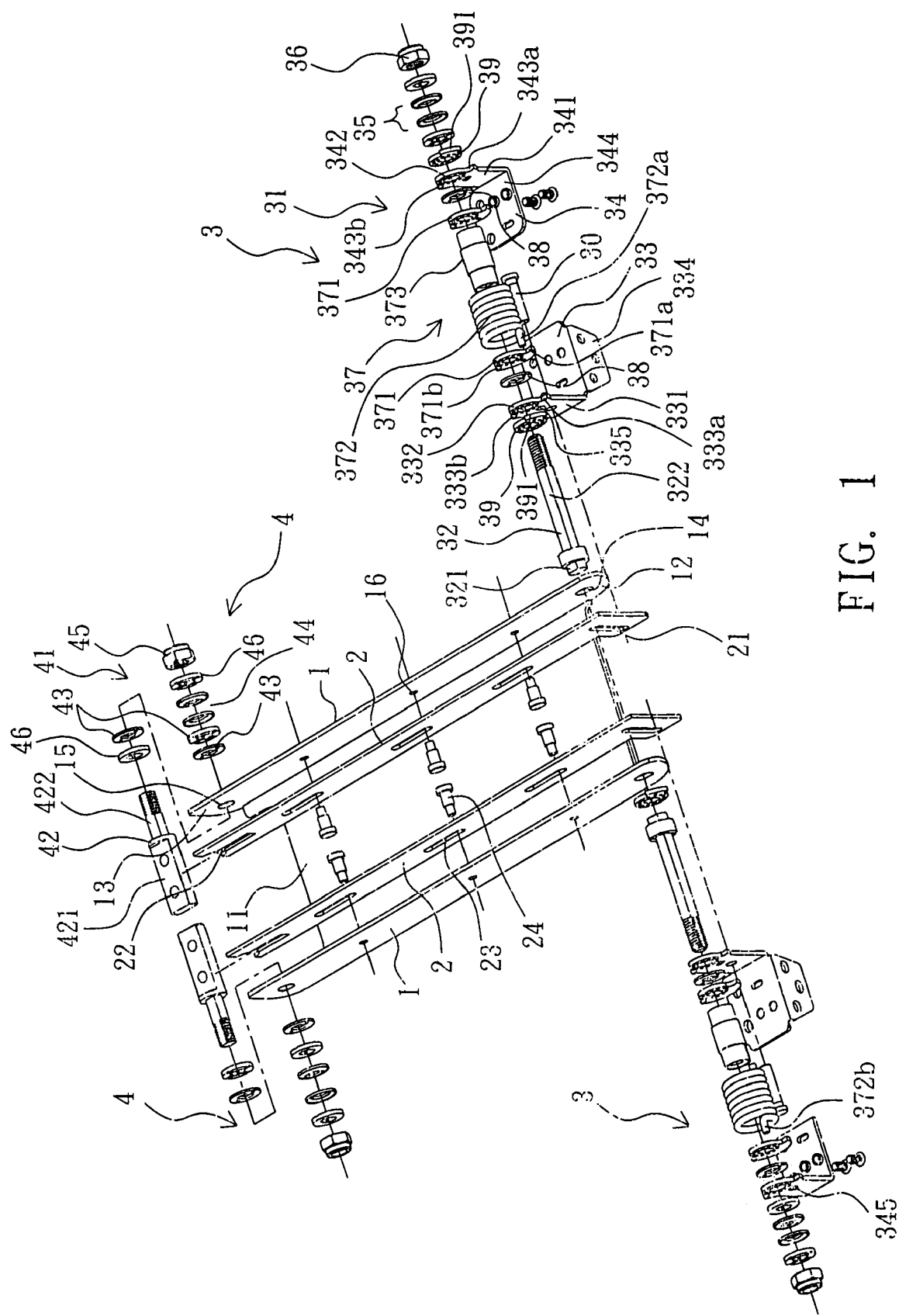
FIG. 1 is an exploded view of a hinge structure according to the present invention.

Referring to FIG. 1, a hinge structure in accordance with the present invention is shown comprised of two master connecting members 1, two auxiliary connecting members 2, a first hinge unit 3, and a second hinge unit 4.

The two master connecting members 1 are narrow, elongated, flat connecting plates joined by a flat bottom plate 11, thereby forming a frame structure shaped like a channel bar. Each master connecting member 1 has a bottom end 12, a top end 13, a bottom mounting hole 14 on the bottom end 12 for the mounting of the first hinge unit 3, and a top mounting hole 15 on the top end 13 for the mounting of the second hinge unit 4.

The auxiliary connecting members 2 are arranged between and close to the two master connecting members 1 in a parallel manner, each having a guide means 21 at the bottom end and a retaining means 22 at the top end. According to the present preferred embodiment, the guide means 21 is a vertical sliding slot, and the retaining means 22 is a Y-shaped notch. Each auxiliary connecting member 2 further has a plurality of elongated slots 23 aligned in a line between the bottom end and the top end. Each master connecting member 1 further has a plurality of mounting holes 16 aligned in a line between the bottom end and the top end corresponding to the elongated slots 23 of the auxiliary connecting members 2. Fastening members, for example, rivets 24 are respectively inserted through the elongated slots 23 of the auxiliary connecting members 2 and affixed to the mounting holes 16 of the master connecting members 1 to secure the auxiliary connecting members 2 to the master connecting members 1, allowing forward/backward displacement of the auxiliary connecting members 2 relative to the master connecting members 1.

The first hinge unit 3 is comprised of two first hinges 31 respectively connected to the bottom ends of the master connecting members 1. Each first hinge 31 comprises a pivot shaft 32, a first mounting frame 33, a second mounting frame 34, a plurality of spring elements, for example, spring washers 35, an end cap 36, and a return spring assembly 37. The pivot shaft 32 has a first end 321 fastened to the bottom mounting hole 14 on the bottom end 12 of the associating master connecting member 1, and a second end 322 inserted through a pivot hole 332 on an upright lug 331 of the first mounting frame 33 and a pivot hole 342 on an upright lug 341 of the second mounting frame 34 and the spring washers 35 and then fastened up with the end cap 36. The first mounting frame 33 and the second mounting frame 34 each have a front stop edge 333a or 343a and a rear stop edge 333b or 343b for supporting the return spring assembly 37.

Further, the first mounting frame 33 has a bottom mounting portion 334 for fastening to the base member of a mobile electronic product. The second mounting frame 34 is a single-piece frame member, having a bottom mounting portion 344 fastened to the bottom wall of the first mounting frame 33 with, for example, screws.

Further, a guide pin 30 is affixed to the upright lug 331 of the first mounting frame 33 and inserted into the guide means (vertical sliding slot) 21 of the associating auxiliary connecting member 2 to guide movement of the associating auxiliary connecting member 2 (this will be described further).

The return spring assembly 37 is coupled between the first mounting frame 33 and the second mounting frame 34, comprised of two rotating plates 371, a sleeve 373 set between the two rotating plates 371, and a torsional spring 372 mounted around the sleeve 373. The second end 322 of the pivot shaft 32 is inserted through the rotating plates 371 and the sleeve 373. The two rotating plates 371 are respectively abutted against the upright lug 331 of the first mounting frame 33 and the upright lug 341 of the second mounting frame 34, each having a front stop edge 371a and a rear stop edge 371b. The torsional spring 372 has a first end 372a stopped at the front stop edge 33a of the upright lug 331 of the first mounting frame 33, and a second end 372b stopped at the rear stop edge 343b of the upright lug 341 of the second mounting frame 34. Therefore, when the pivot shaft 32 is rotated, the two rotating plates 371 are rotated with the pivot shaft 32, and at the same time one end 372a or 372b of the torsional spring 372 is stopped against the front stop edge 33a of the upright lug 331 of the first mounting frame 33 or the rear stop edge 343b of the upright lug 341 of the second mounting frame 34 and the other end 372b or 372a of the torsional spring 372 imparts a pressure to the front stop edge 371a or rear stop edge 371b of the associating rotating plate 371, and therefore the torsional spring 372 is twisted or released subject to the direction of rotation of the pivot shaft 32.

Further, friction pads 38 are affixed to the pivot shaft 32 and respectively set between the first mounting frame 33 and second mounting frame 34 and the rotating plates 371 to enhance the friction force.

Further, limiter means is installed in the mounting frames 33 and 34 to limit the rotating angle of the pivot shaft 32. According to the present preferred embodiment, the limiter means comprises a first stop 335 fixedly provided at the upright lug 331 of the first mounting frame 33 adjacent to the pivot hole 332, a second stop 345 fixedly provided at the upright lug 341 of the second mounting frame 34 adjacent to the pivot hole 342, and two limiter plates 39 affixed to the second end 322 of the pivot shaft 32 and respectively disposed at one side of the upright lug 331 of the first mounting frame 33 and the upright lug 341 of the second mounting frame 34. The limiter plates 39 each have a protrusion 391. When rotating the pivot shaft 32 forwards or backwards, the protrusions 391 of the limiter plates 39 will be stopped against the first stop 335 and second stop 345 to limit the angle of rotation of the pivot shaft 32.

The second hinge unit 4 is comprised of two hinges 41 respectively connected to the top ends of the master connecting members 1. Each hinge 41 is comprised of a pivot shaft 42, a plurality of friction pads 43, a plurality of spring members, for example, spring washers 44, and an end cap 45. The pivot shaft 42 has a first end 421 affixed to the cover of a lifting cover type mobile electronic product and attached to the retaining means (Y-shaped notch) 22 of the associating auxiliary connecting member 2 and prohibited by the retaining means (Y-shaped notch) 22 from rotation, and a second end 422 inserted through the top mounting hole 15 of the associating master connecting member 1 and the friction pads 43 and the spring washers 44 and then fastened up with the end cap 45. Further, lubricating pads 46 are mounted on the second end 422 of the pivot shaft 42 and respectively set between the friction pads 43 and the associating master connecting member 1, between the spring washers 44 and the end cap 45, and between the friction pads 43 and the spring washers 44.

Figure 2:
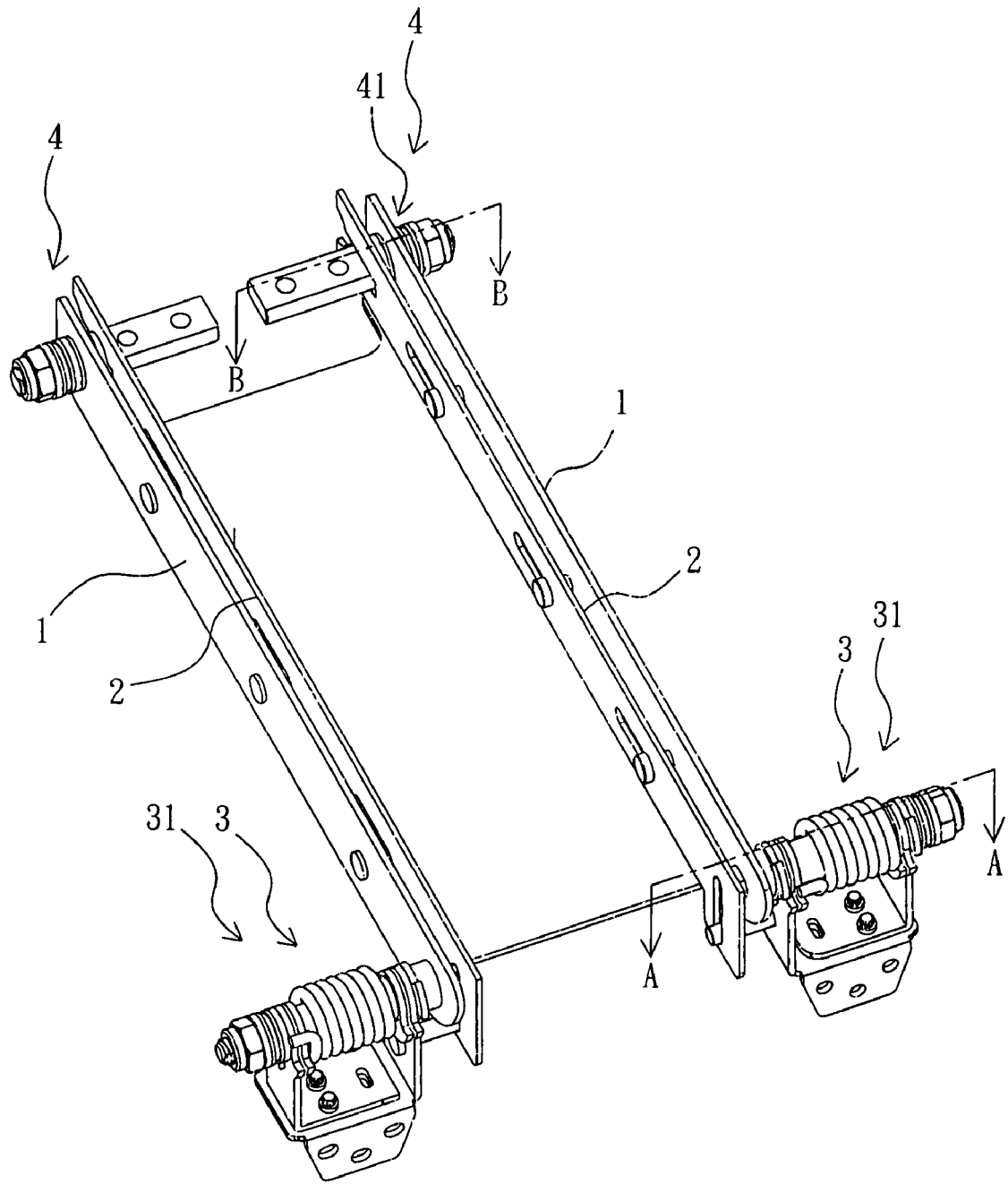
FIG. 2 is an elevational assembly view of the hinge structure according to the present invention.
Figure 3:
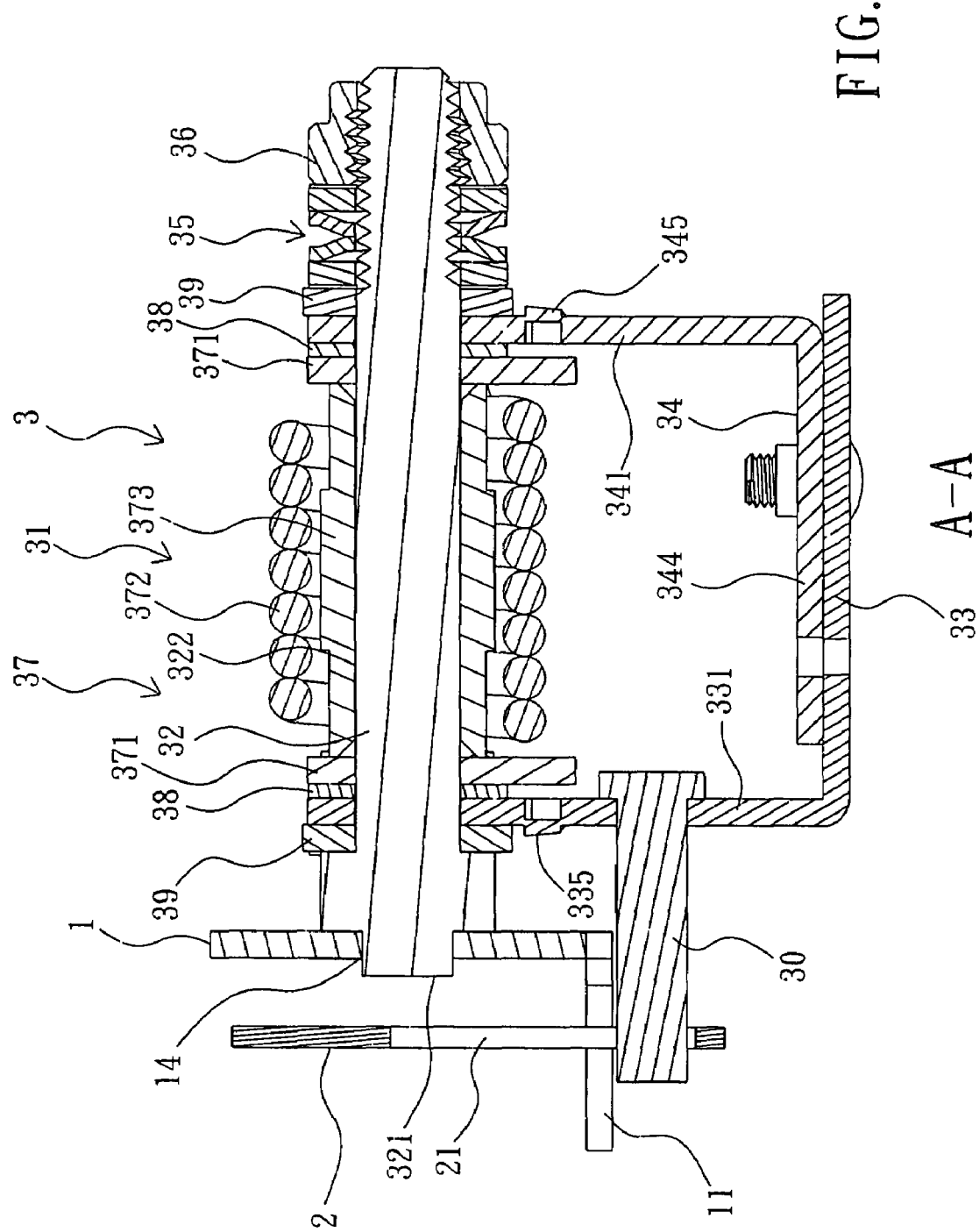
FIG. 3 is a sectional view in an enlarged scale taken along line A-A of FIG. 2.
Figure 4:
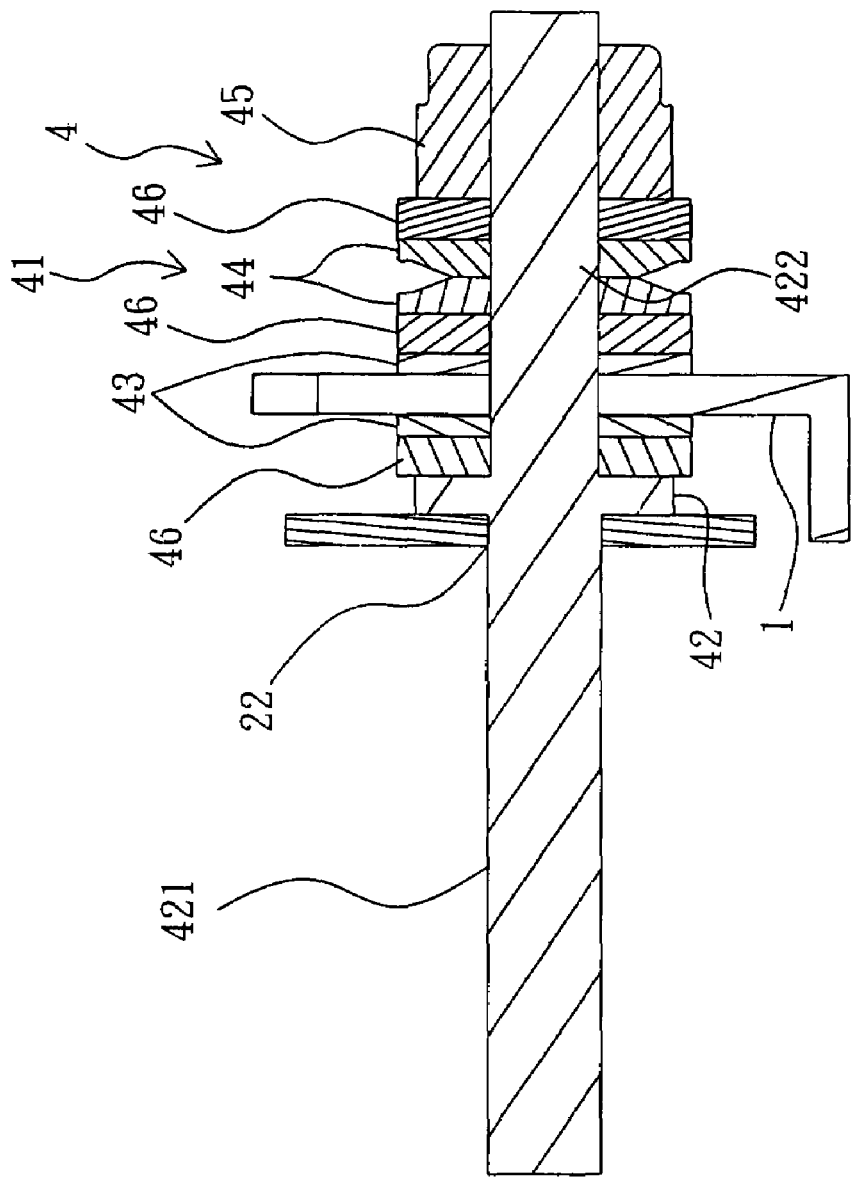
FIG. 4 is a sectional view in an enlarged scale taken along line B-B of FIG. 2.
Figure 5:
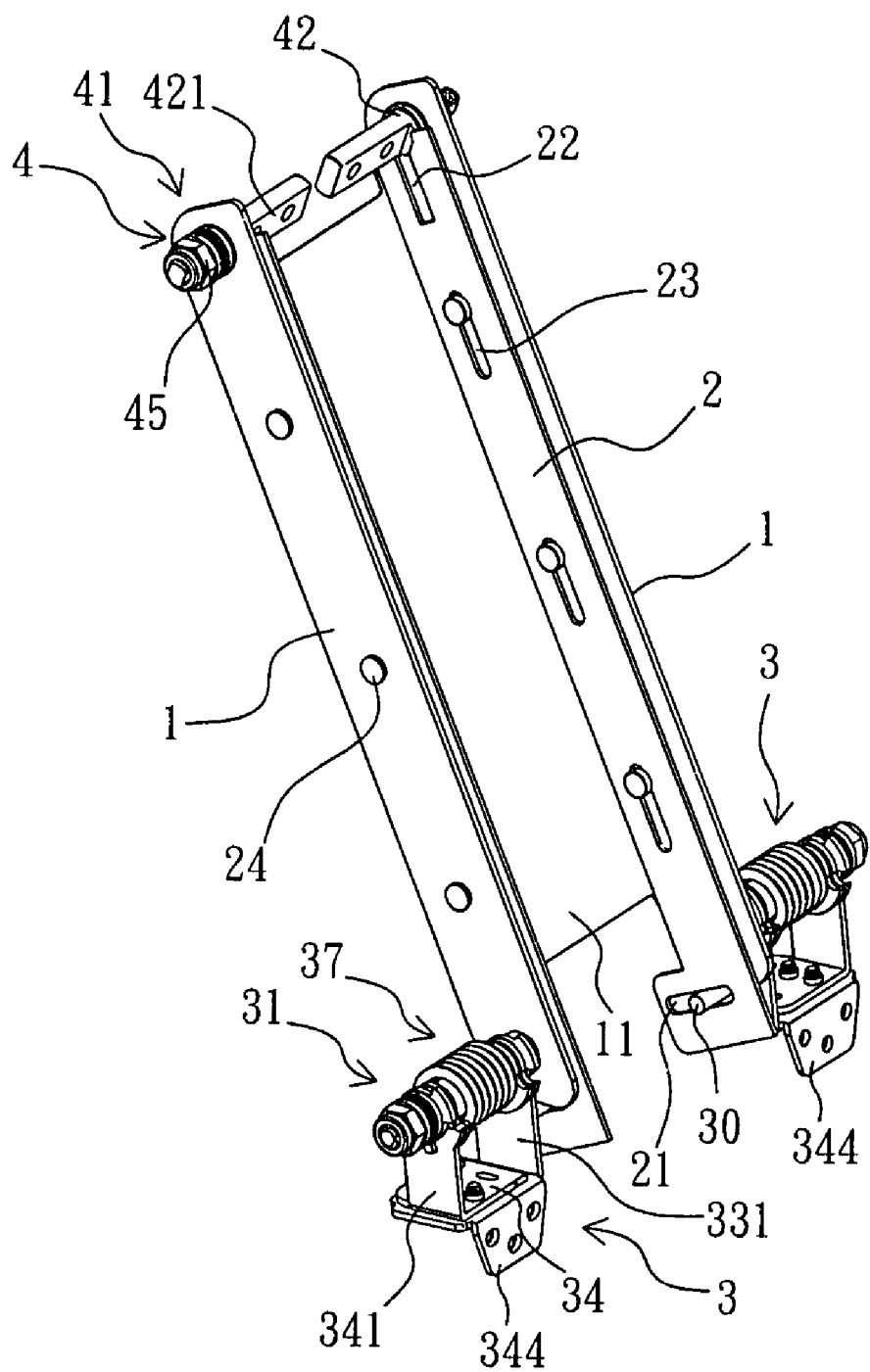
FIG. 5 is an elevational view of the present invention, showing the master and auxiliary connecting members turned relative to the first hinge unit to a predetermined angle and the pivot shafts of the hinges of the second hinge unit unlocked.

FIG. 2 shows the hinge structure assembled. FIGS. 3 and 4 are sectional views showing the hinges 31 and 41 of the hinge units 3 and 4 respectively coupled to the master connecting members 1 and the auxiliary connecting members 2. According to the present preferred embodiment, the hinges 31 and 41 provide a friction force in axial direction during operation. Other hinge designs that provide a friction force in radial direction during operation may be selectively used.

Figure 6:
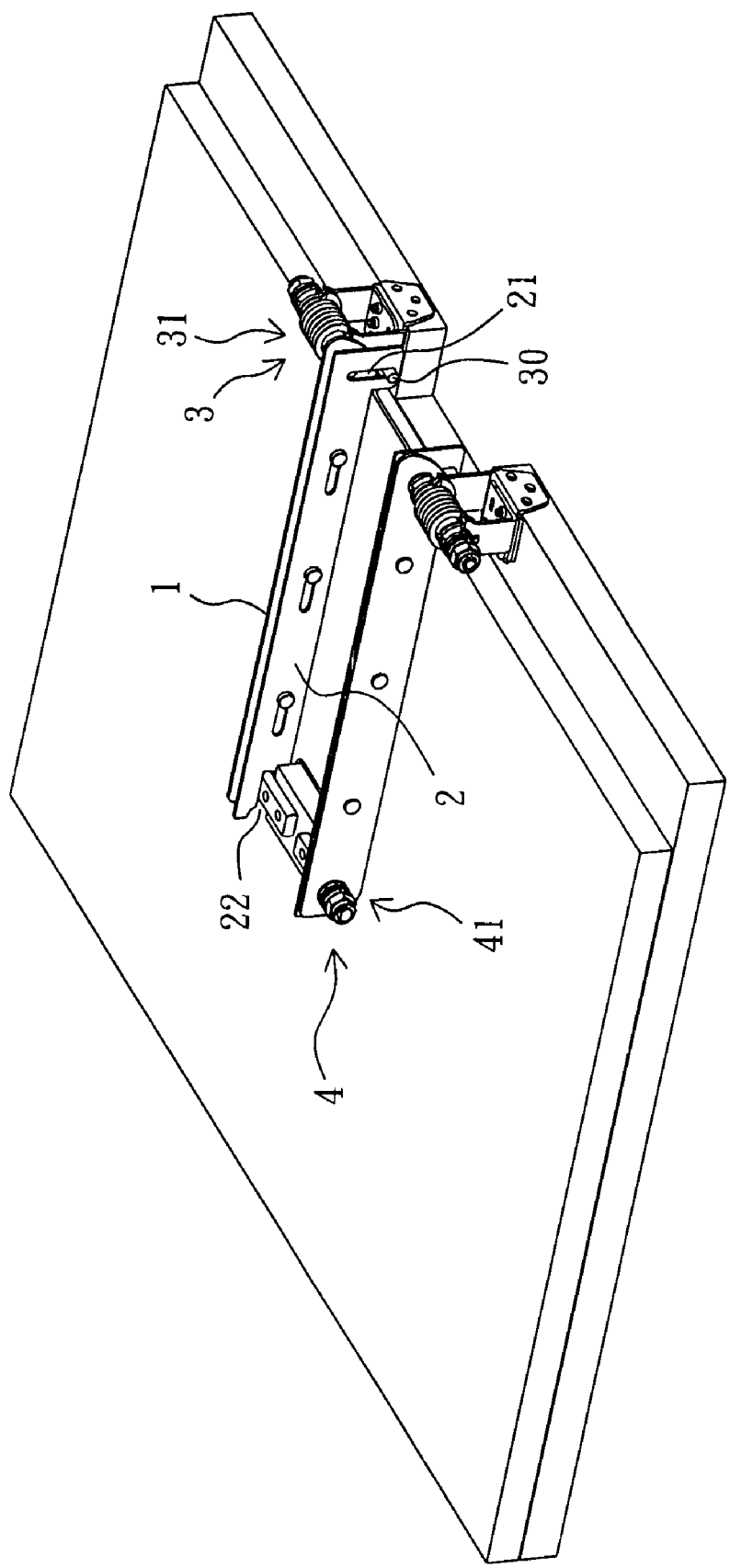
FIG. 6 is an applied view of the present invention, showing the hinge structure installed in a notebook computer and set in the zero angle position.

Referring to FIGS. 2 and 6, the first hinge unit 3 and the second hinge unit 4 are respectively installed in a mobile electronic product, for example, the hinges 31 of the first hinge unit 3 and the hinges 41 of the second hinge unit 4 are respectively installed in the base member and cover containing a display screen of a notebook computer.

When the cover of the notebook computer is closed on the base member, the first end 321 of the pivot shaft 32 of each hinge 31 of the first hinge unit 3 is at 0° angle, and the guide hinge 30 of each hinge 31 of the first hinge unit 3 is at the bottom side of the guide means (vertical sliding slot) 21 of the associating auxiliary connecting member 2, and the first end 421 of the pivot shaft 42 of each hinge 41 of the second hinge unit 4 is secured to the retaining means (Y-shaped notch) 22 of the associating auxiliary connecting member 2, and the hinges 41 of the second hinge unit 4 are locked.

Figure 7:
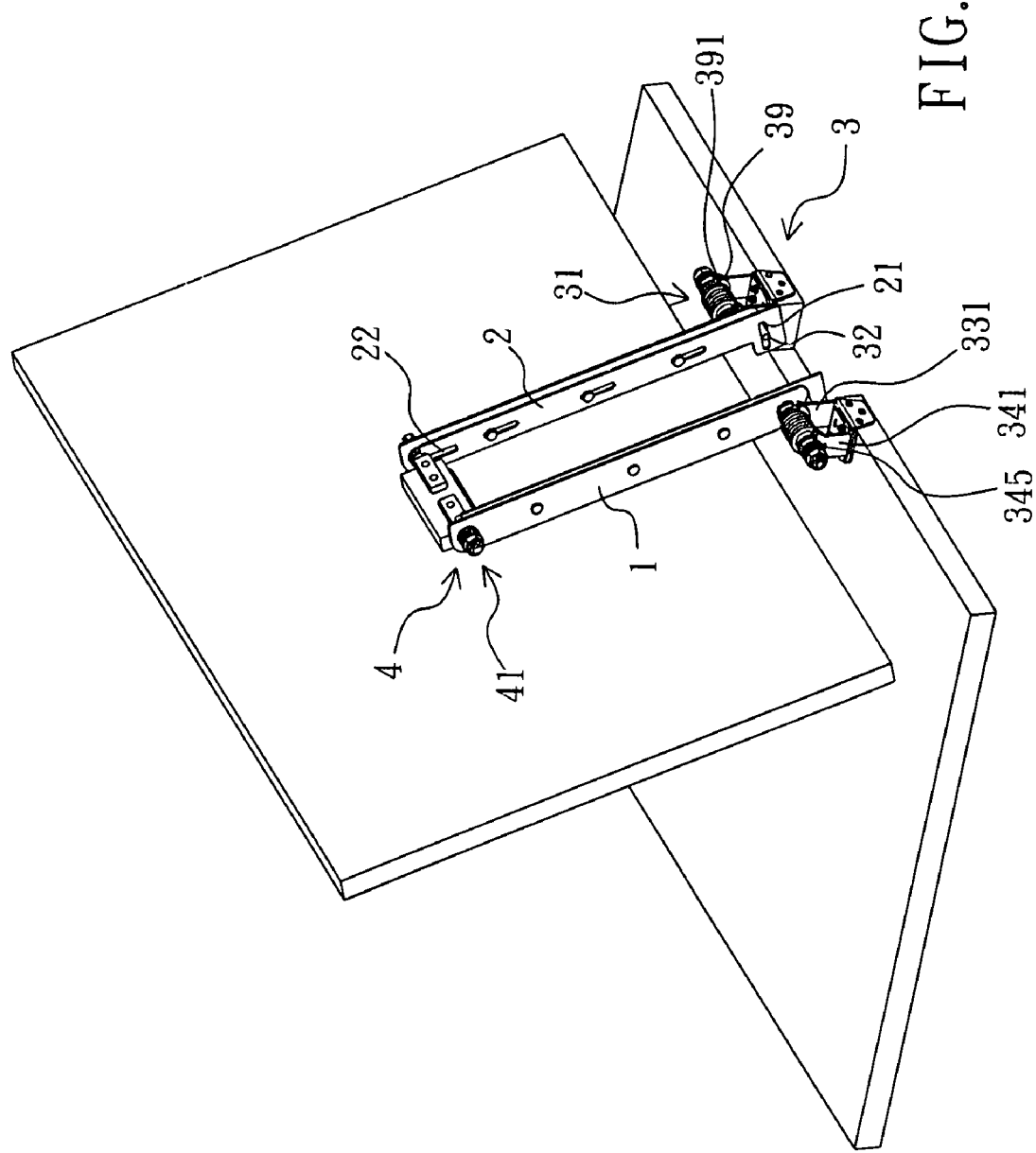
FIG. 7 corresponds to FIG. 6, showing the cover of the notebook computer opened.
Figure 8:
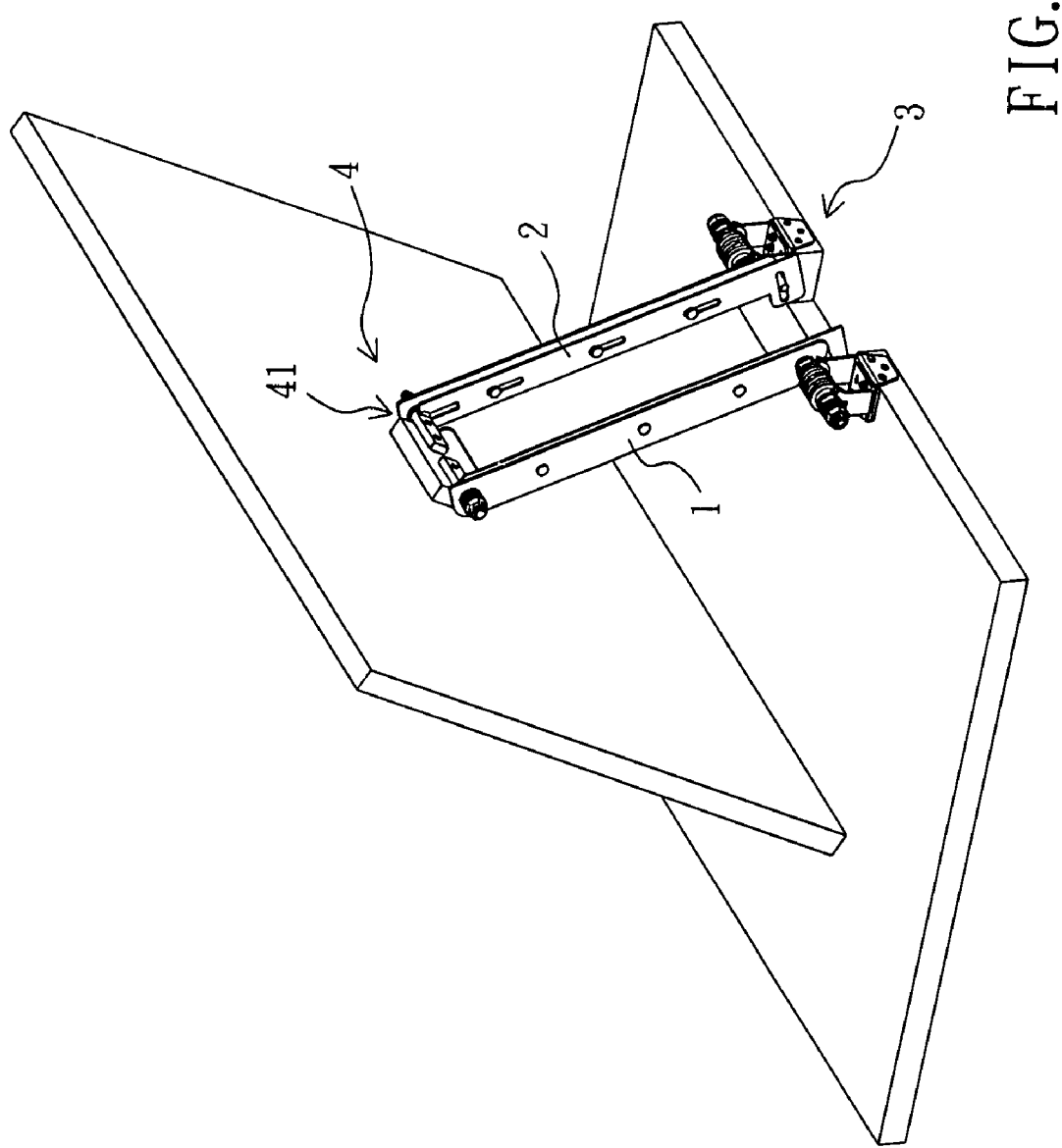
FIG. 8 corresponds to FIG. 7, showing the incline dangle of the cover adjusted.

When opening the cover of the notebook computer, the connecting members 1 are turned with the cover of the notebook computer relative to the base member of the notebook computer to bias the pivot shafts 32 of the hinges 31 of the first hinge unit 3, and at the same time the guide means (vertical sliding slots) 21 of the auxiliary connecting members 2 are moved relative to the associating guide pins 30, causing backward displacement of the auxiliary connecting members 2 relative to the master connecting members 1, and therefore the pivot shafts 42 of hinges 41 of the second hinge unit 4 are gradually moved away from the retaining means (Y-shaped notches) 22 of the associating auxiliary connecting members 2. When the cover of the notebook computer is opened to a predetermined angle, for example, 70°, the protrusions 391 of the limiter plates 39 are stopped against the first stop 335 and second stop 345 to stop the pivot shaft 32 from rotation. At this time, the pivot shafts 42 of hinges 41 of the second hinge unit 4 are disengaged from the retaining means (Y-shaped notches) 22 of the associating auxiliary connecting members 2, i.e., the hinges 41 of the second hinge unit 4 are unlocked as shown in FIG. 7. When the hinges 41 of the second hinge unit 4 are unlocked, the user can bias the cover of the notebook computer to rotate the hinges 41 of the second hinge unit 4 relative to the master connecting members 1 so as to adjust the inclined angle of the cover between, for example, 0° (see FIG. 7) and 45° (see FIG. 8).

As indicated above, the invention allows the cover of a cover lifting type mobile electronic product to be adjusted to the desired inclined angle when the cover is opened to a predetermined angle. This human-factors engineering design allows adjustment of the cover of the over lifting type mobile electronic product to the best view angle.

A prototype of hinge structure has been constructed with the features of FIGS. 1~8. The hinge structure functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A hinge structure installed in a cover lifting type mobile electronic product to couple a cover to a base member for allowing said cover to be opened from said base member and then closed on said base member, the hinge structure comprising:

master connecting means, said master connecting means having a bottom end at a bottom side thereof and a top end at a top side thereof;

auxiliary connecting means arranged in parallel to said master connecting means, said auxiliary connecting means having guide means at a bottom side thereof and retaining means at a top side thereof, said auxiliary connecting means being movable forwards and backwards relative to said master connecting means;

a first hinge unit mounted on said base member of said lifting cover type mobile electronic product and pivoted to the bottom end of said master connecting means for allowing rotation of said master connecting means relative to said base member of said lifting cover type mobile electronic product, said first hinge unit comprising at least one guide pin movably inserted through the guide means of said auxiliary connecting means; and a second hinge unit mounted on said cover of said lifting cover type mobile electronic product and pivotably mounted to the top end of said master connecting means, said second hinge unit being non-rotatably engageable in the retaining means of said auxiliary connecting means to prohibit rotation of said cover relative to said master connecting means; and wherein when opening said cover from said base member, said master connecting means is turned with said cover relative to said base member and said guide means of said auxiliary connecting means is moved relative to said guide pin, thereby causing said auxiliary connecting means to move relative to said master connecting means to have said second hinge unit be released from the retaining means of said auxiliary connecting means for allowing said cover be further rotated relative to said master connecting means.

2. The hinge structure as claimed in claim 1, wherein said guide means comprises at least one vertical sliding slot; said retaining means comprises at least one Y-shaped notch.

3. The hinge structure as claimed in claim 1, wherein said master connecting means comprises a plurality of mounting holes and a plurality of fastening members respectively affixed to the mounting holes of said master connecting means; said auxiliary connecting means comprises a plurality of elongated slots respectively coupled to the fastening members at the mounting holes of said master connecting means to secure said auxiliary connecting means to said master connecting means and to guide forward and backward displacement of said auxiliary connecting means relative to said master connecting means.

4. The hinge structure as claimed in claim 1, wherein said master connecting means is a channel bar having two master connecting members arranged in parallel and a flat base joining said two master connecting members.

5. The hinge structure as claimed in claim 1, wherein said first hinge unit is comprised of two first hinges, said first hinges each comprising a first mounting frame affixed to said base member of said lifting cover type mobile electronic product, said first mounting frame having an upright lug and a pivot hole on the upright lug of said first mounting frame, a second mounting frame affixed to said first mounting frame, said second mounting frame having an upright lug and a pivot hole on the upright lug of said second mounting frame, a pivot shaft, which has a first end fixedly connected to the bottom end of said master connecting means and a second end inserted through the pivot hole on the upright lug of said first mounting frame and the pivot hole on the upright lug of said second mounting frame, an end cap fastened to the second end of the pivot shaft of the associating first hinge, and at least one spring member mounted on the second end of the pivot shaft of the associating first hinge and stopped between the upright lug of said second mounting frame and said end cap.

6. The hinge structure as claimed in claim 5, wherein the second mounting frame of each of said first hinges is fixedly fastened to a bottom wall of the associating first mounting frame with fastening members.

7. The hinge structure as claimed in claim 5, wherein the first mounting frame and second mounting frame of each of said first hinges each have a front stop edge and a rear stop edge; said first hinges each further comprise a return spring assembly mounted on the second end of the pivot shaft and stopped against the front stop edge and rear stop edge of the first mounting frame and second mounting frame of the associating first hinge, said return spring assembly comprising:

two rotating plates respectively affixed to the second end of the pivot shaft of the associating first hinge and respectively abutted against the upright lugs of the first mounting frame and second mounting frame of the associating first hinge for synchronous rotation with the associating pivot shaft relative to the first mounting frame and second mounting frame of the associating first hinge, said rotating plates each having a front stop edge and a rear stop edge;

a sleeve sleeved onto the second end of the pivot shaft of the associating first hinge between said two rotating plates; and a torsional spring arranged around said sleeve, said torsional spring having a first end stopped at the front stop edge of the upright lug of the first mounting frame of the associating first hinge, and a second end stopped at the rear stop edge of the upright lug of the second mounting frame of the associating first hinge; and wherein when the pivot shaft of each of said first hinges is rotated with said master connecting means in one direction, the rotating plates of the associating return spring assembly are rotated with the associating pivot shaft, thereby causing the associating torsional spring to be twisted and compressed; when the pivot shaft of each of said first hinges is rotated with said master connecting means in the reversed direction, the rotating plates of the associating return spring assembly are rotated with the associating pivot shaft, thereby causing the associating torsional spring to be released.

8. The hinge structure as claimed in claim 7, wherein said first hinges each further comprise a plurality of friction pads mounted on the associating pivot shaft for synchronous rotation with the associating pivot shaft and respectively set between the associating first mounting frame and second mounting frame and the associating rotating plates.

9. The hinge structure as claimed in claim 5, wherein said first hinges each further comprise a limiter means installed in the associating first and second mounting frames to limit the rotating angle of the associating pivot shaft, said limiter means comprising a first stop fixedly provided at the upright lug of the associating first mounting frame, a second stop fixedly provided at the upright lug of the associating second mounting frame, and two limiter plates affixed to the second end of the associating pivot shaft and respectively disposed at one side of the upright lug of the associating first mounting frame and the upright lug of the associating second mounting frame, said limiter plates each having a protrusion corresponding to the first stop at the upright lug of the associating first mounting frame and the second stop fixedly provided at the upright lug of the associating second mounting frame.

10. The hinge structure as claimed in claim 1, wherein said second hinge unit is comprised of two second hinges, said second hinges each comprising a pivot shaft, a plurality of friction pads, a plurality of spring members, and an end cap, the pivot shaft of each of said second hinges having a first end affixed to the cover of said lifting cover type mobile electronic product and attached to the retaining means of said auxiliary connecting member and a second end pivotally inserted through a hole of said master connecting member and the friction pads and the spring members of the respective second hinge and then fastened up with the end cap of the respective second hinge.

* * * * *